United States Patent [19]
Longhenry et al.

[11] Patent Number: 5,991,865
[45] Date of Patent: Nov. 23, 1999

[54] MPEG MOTION COMPENSATION USING OPERAND ROUTING AND PERFORMING ADD AND DIVIDE IN A SINGLE INSTRUCTION

[75] Inventors: Brian E. Longhenry, Cypress; Gary W. Thome, Tomball; John S. Thayer, Houston, all of Tex.

[73] Assignee: Compaq Computer Corporation, Houston, Tex.

[21] Appl. No.: 08/774,745

[22] Filed: Dec. 31, 1996

[51] Int. Cl.[6] .................................................. G06F 13/00
[52] U.S. Cl. .................. 712/7; 712/3; 712/6; 712/14; 712/22; 712/208; 712/221
[58] Field of Search ................. 395/800.01, 800.02, 395/800.07, 800.09, 800.06, 800.03, 800.14, 800.22, 800.23, 384; 712/3, 6, 14, 22, 208, 221

[56] References Cited

U.S. PATENT DOCUMENTS

| | | | |
|---|---|---|---|
| 4,621,339 | 11/1986 | Wagner et al. | 364/900 |
| 5,020,014 | 5/1991 | Miller et al. | 364/723 |
| 5,175,701 | 12/1992 | Newman et al. | 364/723 |
| 5,627,956 | 5/1997 | Dao et al. | 395/143 |
| 5,636,153 | 6/1997 | Ikegaya et al. | 364/736 |
| 5,694,345 | 12/1997 | Peterson | 364/723 |
| 5,748,792 | 5/1998 | Wober | 382/250 |
| 5,757,670 | 5/1998 | Ti et al. | 364/514 |
| 5,758,176 | 5/1998 | Agarwal et al. | 395/800 |
| 5,774,676 | 6/1998 | Stearns et al. | 395/200.77 |
| 5,850,227 | 1/1998 | Longhenry et al. | 395/439 |
| 5,862,063 | 1/1999 | Thome et al. | 395/723 |

OTHER PUBLICATIONS

Implementation of Fast Fourier Transforms on Motorola's Digital Signal Processors, Motorola, Inc. (1993), pp. 3–1—4–33.

The Fast Fourier Transform, McGraw Hill (1993), pp. 27–54.

Kohn, L., et al., The Visual Instruction Set (VIS) in Ultra SPARC™, IEEE (1995), pp. 482–489.

Lee, Ruby B., Realtime MPEG Video via Software Decompression on a PA–RISC Processor, IEEE (1995), pp. 186–192.

Zhou, et al., MPEG Video Decoding with the UltraSPARC Visual Instruction Set, IEEE (1995), pp. 470–474.

Papamichalis, Panos, *An Implementation of FFT, DCT, and other Transforms on the TMS320C30*, (1990), pp. 53–119.

Goslin, Gregory Ray, Implement DSP functions in FPGAs to reduce cost and boost performance, EDN, Oct. 10, 1996, pp. 155–164.

Gwennap, Linley, UltraSparc Adds Multimedia Instructions, Microprocessor Report, Dec. 5, 1994, pp. 16–18.

Compression Technology, MPEG Overview, C–Cube Microsystems, Oct. 8, 1996, pp. 1–9.

Lee, Woobin, MPEG Compression Algorithm, ICSL, Apr. 20, 1995, 7 pages.

Programmer's Reference Manual, Intel Architecture MMX™ Technology, Chapters 2–5, Intel Corp., printed Sep. 26, 1996.

*Primary Examiner*—Richard L. Ellis
*Assistant Examiner*—Dzung Nguyen
*Attorney, Agent, or Firm*—Akin, Gump, Strauss, Hauer & Feld, LLP

[57] ABSTRACT

A routable operand and selectable operation processor multimedia extension unit is employed to motion compensate MPEG video using improved vector processing. A vector processing unit executes an add and divide instruction that adds two vector registers and divides the result in a single instruction. This is implemented through loading a first vector register with a first plurality of elements from a source block. A second vector register is then loaded with a second plurality of elements that are adjacent to the first plurality of elements. The add and divide instruction is then executed on the first and second vector registers, yielding an interpolated source element that is stored in a resultant vector register.

12 Claims, 12 Drawing Sheets

Microfiche Appendix Included
(1 Microfiche, 16 Pages)

MPEG MOTION COMPENSATION USING OPERAND ROUTING AND PERFORMING ADD AND DIVIDE IN A SINGLE INSTRUCTION

REFERENCE TO A MICROFICHE APPENDIX

The specification includes a software program submitted as a microfiche appendix. The microfiche appendix includes one (1) microfiche which has sixteen (16) frames.

BACKGROUND OF THE INVENTION

1. Field of the Invention

The invention pertains to parallel algorithms for execution by a operand-rerouting, multi-operation vector processor. More specifically, the invention relates to an improved MPEG motion compensation technique on such a processor.

2. Description of the Related Art

The microcomputer industry has seen a metamorphosis in the way computers are used over the last number of years. Originally, most operating systems were text based requiring typed user input and providing textual response. These systems have given way to graphical based environments. Current systems are heavily graphically based, both providing graphical user interfaces including icons, windows, and the like, and providing graphical interaction with a user through a variety of user input devices.

This trend is likely to continue. But graphical, multimedia environments place different and greater demands on processor capabilities than the old textual environments. For many years, the Intel x86 series of processors by Intel Corporation has provided the computing power for IBM PC compatible machines. The architecture of the Intel design, however, is not optimized towards graphical operations.

To this end, a number of extensions to the x86 architecture have been proposed and developed. These include the MMX extensions developed by Intel Corporation. Further, other manufacturers have similarly extended their instruction sets. For example, Sun Microcomputing has developed the UltraSparc, a graphics extension of the SPARC V9 architecture.

Typical vector processors provide for multiple operations simultaneously, but require that the same operation be performed by each partition within the vector (SIMD, or single instruction multiple data). In the multimedia extension unit architecture, this has changed. Not only can multiple operations be concurrently executed on vectorized data, but different operations can be simultaneously performed, and the vectorized data can be rerouted through a number of multiplexers.

This architecture presents a number of possibilities, but developing algorithms that efficiently utilize this architecture places its own demands, given the new features of the instruction set. It is desirable to efficiently utilize this architecture to execute algorithms for multimedia.

One particular area of interest in multimedia environments is the decompression and playback of real time video. A principal standard which has been developed by industry is "MPEG," which provides for both coding and decoding of real time video. In the various MPEG techniques, which are described in more detail in various MPEG standards for which various routines have been developed by the MPEG Software Simulation Group, a key technique is known as motion estimation and compensation. In this technique, "macro blocks" of a source frame are shifted for a resulting destination frame. As part of this shifting, interpolation may be needed between adjacent pixels of a source frame. Any improvements in efficiency of such motion compensation are greatly desirable.

SUMMARY OF THE INVENTION

According to the invention, a multimedia extension unit architecture performs MPEG motion compensation for graphical display through new, faster, and unique techniques. The MPEG algorithm is highly vectorized. Specifically, MPEG motion compensation requires the interpolation of adjacent pixels. This interpolation is performed in a single instruction, which both adds two adjacent pixels and divides the result by two, yielding the interpolated results.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
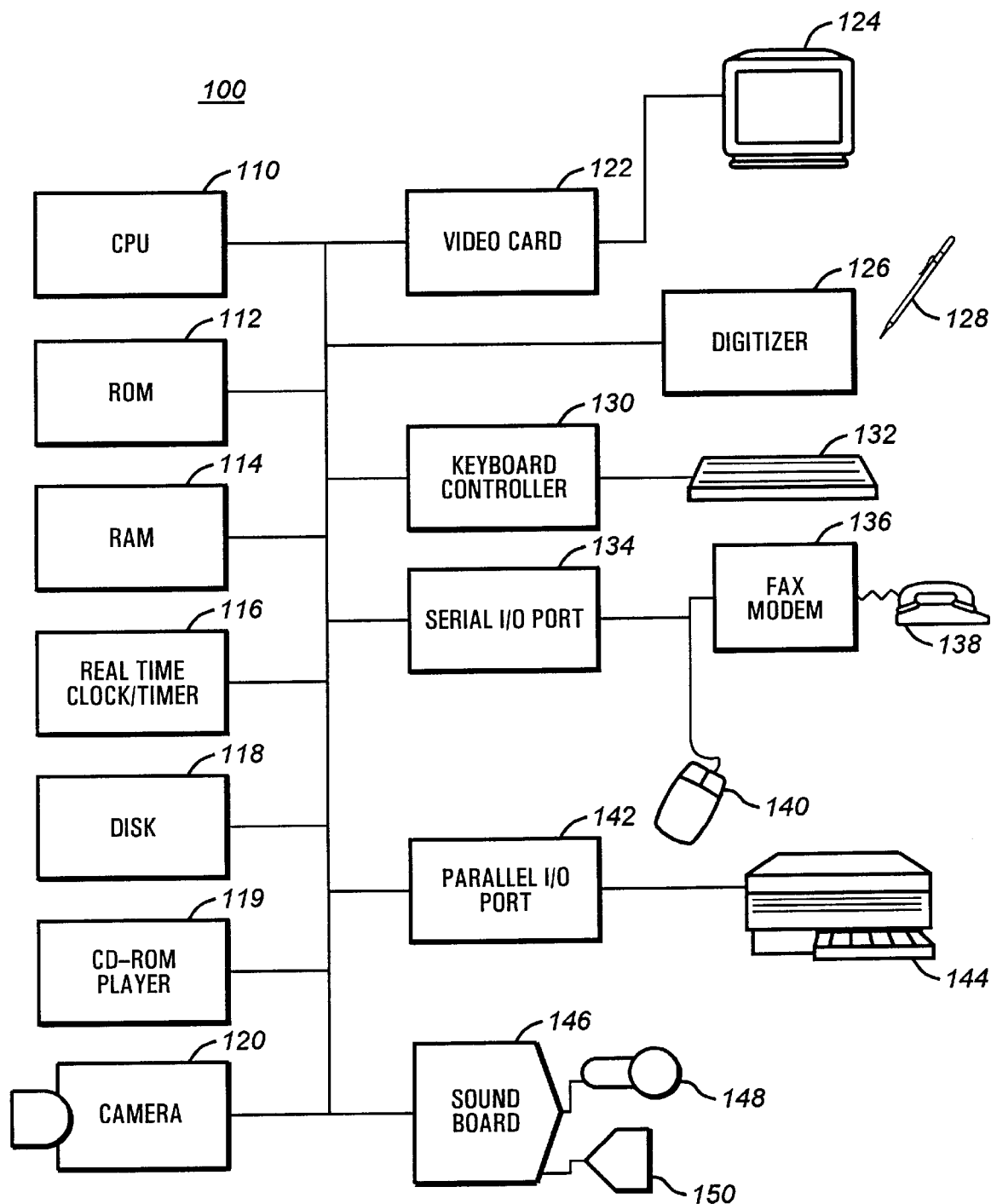
FIG. 1 is a block diagram of a computer system having a processor and a multimedia extension unit of the present invention.
Figure 2:
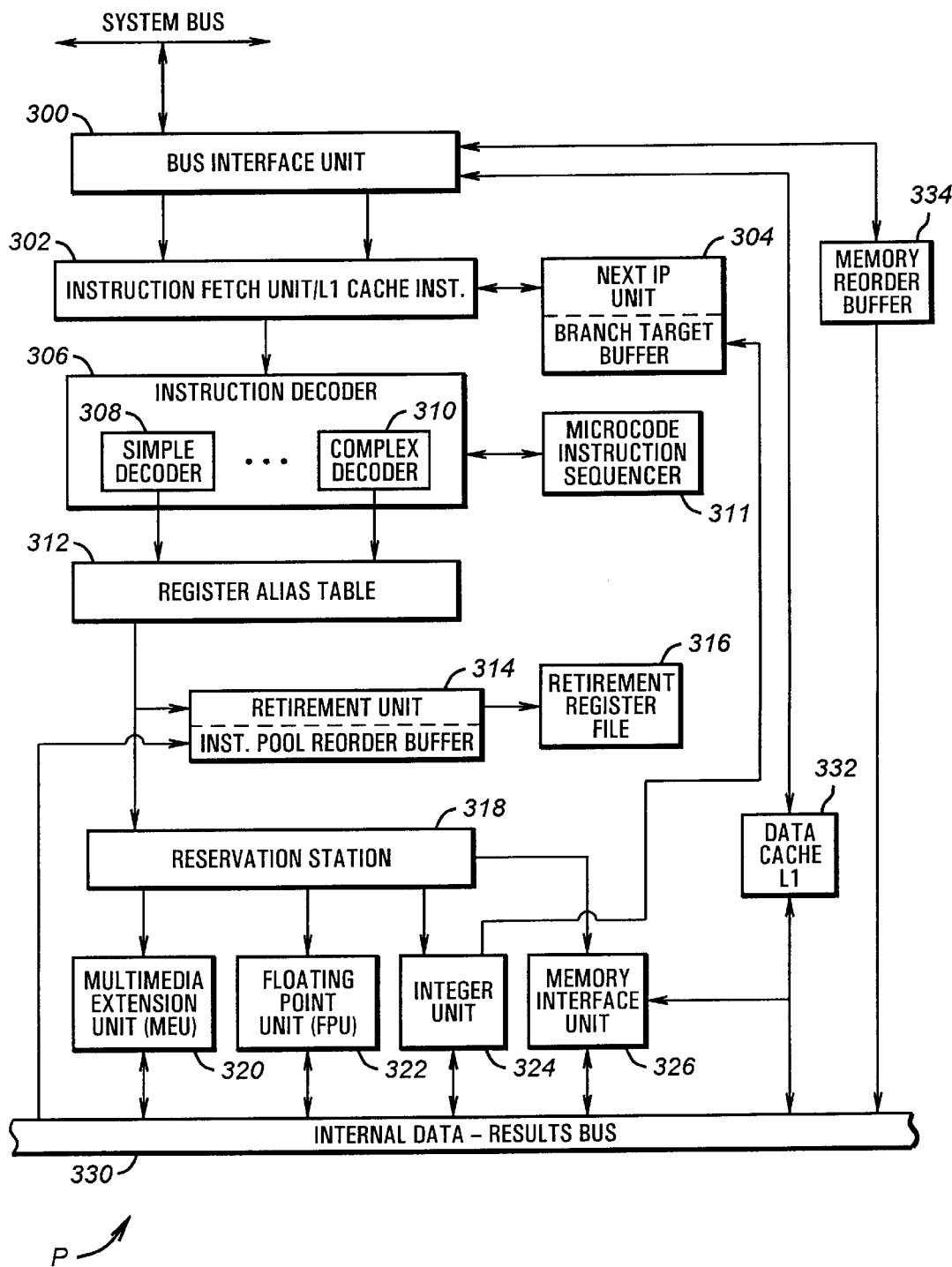
FIG. 2 shows a micro-architecture of the processor and the multimedia enhanced unit of FIG. 1.

Turning now to the drawings, FIG. 1 shows a block diagram of a computer 100. In FIG. 1, a central processing unit (CPU) 110 provides processing power for the computer system 100. The CPU 110 is preferably an Intel Pentium-Pro® processor with an multimedia extension unit (MEU), as shown in FIG. 2. However, a number of other microprocessors suitably equipped with an MEU may be used, including a PowerPC microprocessor, an R4000 microprocessor, a Sparc microprocessor, or an Alpha microprocessor, among others. The CPU 110 is connected to a read only memory (ROM) 112. The ROM 112 provides boot code such as a system BIOS software that boots up the CPU 110 and executes a power-on self test (POST) on the computer system 100.

In addition, the CPU 110 is connected to a random access memory (RAM) 114. The RAM 114 allows the CPU 110 to buffer instructions as well as data in its buffer while the computer 100 is in operation. The RAM 114 is preferably a dynamic RAM array with 32 megabytes of memory. The CPU 110 is also connected to a real time clock and timer 116. The real time clock and timer 116 stores the date and time information for the CPU 110. Furthermore, the real time clock and timer 116 has a lithium backup battery to maintain the time information even when the computer system 100 is turned off.

The CPU 110 is also connected to a disk storage device 118. The disk storage device 118 stores executable code as well as data to be provided to the CPU 110. Additionally, the CPU 110 is connected to a CD-ROM drive. Typically, an IBM PC compatible computer controls the disk drive 118 and the CD-ROM player 119 via an Intelligent Drive Electronics (IDE) interface.

Additionally, the CPU 110 is connected to a camera 120. The camera 120 supports video conferencing between the user and other users. The camera 120 essentially consists of a lens, a charge-coupled-device (CCD) array, and an analog to digital converter. The lens focuses light onto the CCD array, which generates voltages proportional to the light. The analog voltages generated by the CCD array are converted into a digital form by the analog to digital converter for processing by the CPU 110.

The CPU 110 is also connected to a video card 122. On the back of the video card 122 are one or more jacks. Connectors for monitors can be plugged into the jacks. The connectors, which are adapted to be plugged into the jacks of the video card 122, eventually are connected to the input of a video monitor 124 for display.

A pen-based user interface is also provided. A digitizer 126 is connected to the CPU 110 and is adapted to capture user input. Additionally, a pen 128 is provided to allow the user to operate the computer. The pen 128 and digitizer 126 in combination supports another mode of data entry in addition to a keyboard 132.

The video monitor 124 receives output video signals from the CPU 110 and displays these signals to the user. The keyboard 132 is connected to a keyboard controller 130 and provides input information to the CPU 110. Additionally, one or more serial input/output (I/O) ports 134 are provided in the computer system 100. Connected to the serial I/O ports 134 are a plurality of peripherals, including a mouse 140 and a facsimile modem 136. The facsimile modem 136 in turn is connected to a telephone unit 138 for connection to an Internet service provider, for example. Preferably, the modem 136 is a 28.8 kilobits per second modem (or greater) that converts information from the computer into analog signals transmitted by ordinary phone lines or plain old telephone service (POTS). Alternatively, the modem 136 could connect via an integrated service digital network (ISDN) line to transfer data at higher speeds.

Furthermore, a parallel input/output (I/O) port 142 is provided to link to other peripherals. Connected to the parallel I/O port 142 is a laser printer 144. Additionally, a microphone 148 is connected to a sound board 146 which eventually provides input to the CPU 110 for immediate processing or to a disk drive 118 for offline storage. The sound board 146 also drives a music quality speaker 150 to support the multimedia-based software. As multimedia programs use several medium, the multimedia computer system of the present invention integrates the hardware of the computer system 100 of the present invention. For example, the sound board 146 is used for sound, the monitor 124 is used to display movies and the CD-ROM player 119 is used for audio or video. In this manner, sounds, animations, and video clips are coordinated to make the computer session more friendly, usable and interesting.

Turning now to FIG. 2, a functional block diagram of the processor microarchitecture employed by the present invention is shown. The processor of the present invention is preferably based on an Intel-compatible Pentium-Pro microprocessor. The mode employed by the present invention is in addition to the existing modes of the 486 and Pentium processors, and unless otherwise indicated, the operation and features of the processors remain unchanged. Familiarity with the operation of the 486, Pentium and Pentium Pro are assumed in this description. For additional details, reference should be made to the appropriate data book. However, the invention could also be used in earlier processor generations such as the Intel Pentium™, 80486™, 80386™, 80286™, and 8086™ microprocessors. The use of the features of the multimedia extension unit could also be used with other types of microprocessors, including without limitation, the Power PC architecture, the Sparc architecture, and the MIPS R4000 architecture. For purposes of this disclosure, the terms microprocessor and processor can be used interchangeably.

In FIG. 2, the processor P employed by the present invention interacts with the system bus and the Level 2 cache (not shown) via a bus interface unit 300. The bus interface unit 300 accesses system memory through the system bus. Preferably, the bus interface unit 300 is a transaction oriented 64-bit bus such that each bus access handles a separate request and response operation. Thus, while the bus interface unit 300 is waiting for a response to one bus request, it can issue additional requests. The interaction with the Level 2 cache via the bus interface unit 300 is also transaction oriented. The bus interface unit 300 is connected to a combination instruction fetch unit and a Level 1 instruction cache 302. The instruction fetch unit of the combination unit 302 fetches a 32-byte cache line per clock from the instruction cache in the combination unit 302. The combination unit 302 is also connected to an instruction pointer unit and branch target buffer combination 304. The branch target buffer in turn receives exception/interrupt status and branch misprediction indications from an integer execution unit 324, as discussed below.

Additionally, the instruction fetch unit/L1cache combination 302 is connected to an instruction decoder 306. The instruction decoder 306 contains one or more simple decoders 308 and one or more complex decoders 310. Each of decoders 308 and 310 converts an instruction into one or more micro-operations ("micro-ops"). Micro-operations are primitive instructions that are executed by the processor's execution unit. Each of the micro-operations contains two logical sources and one logical destination per microoperation.

The processor P has a plurality of general purpose internal registers which are used for actual computation, which can be either integer or floating point in nature. To allocate the internal registers, the queued micro-ops from the instruction decoder 306 are sent to a register alias table unit 312 where references to the logical register of the processor P are converted into internal physical register references. Subsequently, allocators in the register alias table unit 312 add status bits and flags to the micro-ops to prepare them for out of order execution and sends the resulting micro-ops to an instruction pool 314.

The instruction pool 314 is also connected to a reservation station 318. The reservation station 318 also receives the output of the register alias table 312. The reservation station 318 handles the scheduling and dispatching of micro-ops from the instruction pool 314. The reservation station 318 supports classic out-of-order execution where micro-ops are dispatched to the execution unit strictly according to data flow constraints and execution resource availability to optimize performance.

The reservation station 318 is in turn connected to a plurality of execution units, including a multimedia extension unit (MEU) 320, a floating point unit (FPU) 322, an integer unit (IU) 324, and a memory interface unit (MIU) 326. The MEU 320, FPU 322, IU 324 and MIU 326 are in turn connected to an internal data-results bus 330. The internal data-results bus 330 is also connected to the instruction pool 314, a Level 1 data cache 332 and a memory reorder buffer 334. Furthermore, the Level 1 data cache 332 and the memory reorder buffer 334 are connected to the bus interface unit 300 for receiving multiple memory requests via the transaction oriented bus interface unit 300. The memory reorder buffer 334 functions as a scheduling and dispatch station to track all memory requests and is able to reorder some requests to prevent data blockage and to improve throughput.

Turning now to the execution units, the memory interface unit 326 handles load and store micro-ops. Preferably, the memory interface unit 326 has two ports, allowing it to process the address on a data micro-op in parallel. In this manner, both a load and a store can be performed in one clock cycle. The integer unit 324 is an arithmetic logic unit (ALU) with an ability to detect branch mispredictions. The floating point execution units 322 are similar to those found in the Pentium processor. From an abstract architectural view, the FPU 322 is a coprocessor that operates in parallel with the integer unit 324. The FPU 322 receives its instruction from the same instruction decoder and sequencer as the integer unit 324 and shares the system bus with the integer unit 324. Other than these connections, the integer unit 324 and the floating point unit 322 operate independently and in parallel.

In the preferred embodiment, the FPU 322 data registers consist of eight 80-bit registers. Values are stored in these registers in the extended real format. The FPU 322 instructions treat the eight FPU 322 data registers as a register stack. All addressing of the data registers is relative to the register on top of the stack. The register number of the current top of stack register is stored in the top. Load operations decrement the top by one and load a value into the new top of stack register, and store operations store the value from the current top register in memory and then increment top by one. Thus, for the FPU 322, a load operation is equivalent to a push and a store operation is equivalent to a pop in the conventional stack.

Referring now to the multimedia extension unit (MEU) 320, the MEU 320 enhances the instruction set to include vector instructions, partitioned instructions operating on small data elements, saturating arithmetic, fixed binary point data, data scaling support, multimedia oriented ALU functions, and flexible operand routing. To preserve compatibility and minimize the hardware/software impact, the MEU 320 uses the same registers as the FPU 322. When new multimedia instructions are executed on the MEU 320, the registers of the FPU 322 are accessed in pairs. As the FPU 322 registers each have 80 bits of data, the pairing of the FPU 322 registers effectively creates four 160-bit wide registers, as further discussed below. Furthermore, the MEU 320 adds newly defined instructions which treat registers as vectors of small fixed point data values rather than large floating point numbers. Since the operating system saves the entire state of the FPU 322 as necessary during context switches, the operating system needs not be aware of the new functionality provided by the MEU 320 of the present invention. Although the disclosed system contemplates that the MEU 320 and the FPU 322 share logic or registers, the processor P could simply have snooping logic that maintains coherency between register values in completely separate MEU 320 and FPU 322 sections.

With respect to status and control bits, the FPU 322 has three registers for status and control: status word, control word, and tag word. These FPU 322 registers contain bits for exception flags, exception masks, condition codes, precision control, routing control and stack packs. The MEU 320 does not use or modify any of these bits except for the stack pack bits, which is modified because the MEU 320 result values are often not valid floating point numbers. Thus, anytime a MEU instruction is executed, the entire FPU tag word is set to 0xffffh, marking all FPU 322 registers as empty. In addition, the top of stack pointer in the FPU 322 status words (bits 11–13) is set to 0 to indicate an empty stack. Thus, any MEU 320 instruction effectively destroys any floating point values that may have been in the FPU 322. As the operating system saves and restores the complete FPU state for each task, the destruction of floating point values in the FPU 322 is not a problem between tasks. However, appropriate software action may need to be taken within a single task to prevent errors arising from modifications to the FPU 322 registers.

The sharing of the registers of the FPU 322 and the MEU 320 avoids adding any new software visible context, as the MEU 320 does not define any new processor status, control or condition code bits other than a global MEU extension enable bit. Furthermore, the MEU 320 can execute concurrently with existing instructions on the registers of the integer unit 324. Therefore, the CPU 110 logic is well utilized as the MEU 320 is efficiently dedicated to signal processing applications while the FPU 322 is dedicated to floating point intensive applications and the integer unit 324 handles addressing calculations and program flow control. Additionally, the MEU 320 allows for scalability and modularity, as the MEU 320 does not change the integer or load/store units. Thereby, the CPU 110 core design is not impacted when the MEU 320 is included or excluded from the processor P.

Figure 3:
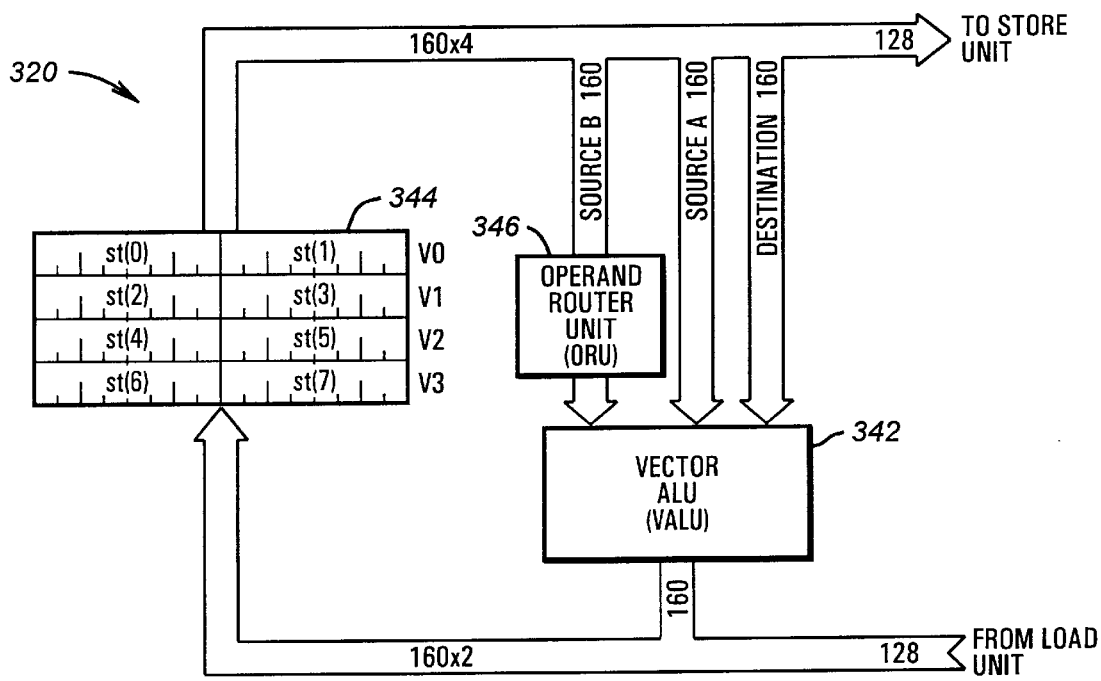
FIG. 3 is a more detailed block diagram of the multimedia extension unit of FIG. 2.

Referring now to FIG. 3, a more detailed block diagram of the MEU 320 is shown. The MEU 320 contains a vector arithmetic logic unit (VALU) 342. The VALU 342 is in turn connected to a plurality of vector registers 344, preferably four. These vector registers are preferably the same registers as those present in the FPU 322.

In the MEU 320, the FPU registers 344 are accessed in pairs. As each of the FPU 322 registers is 80 bits in width, the pairing of the FPU 322 registers effectively creates four 160-bit wide vector registers 344. Thus, as shown in FIG. 3, the register pairs of the FPU 322 are referred to as V0, V1, V2 and V3 and correspond to the physical FPU 322 registers. For instance, FPU 322 physical register 0 is the same as the lower half of the MEU 320 vector register V0.

Similarly, FPU 322 physical register 1 is the same as the upper half of MEU 320 vector register V0, while the FPU 322 physical register 7 is the same as the upper half of the MEU 320 vector register V3. Furthermore, in the MEU 320 of FIG. 3, the stack based access model of the 80×87 floating point instructions is not utilized. Instead, the 160-bit registers V0–V3 are partitioned to form vectors of 10-bit or 20-bit data elements.

The output of the vector registers 344 are subsequently provided to an operand router unit (ORU) 346 and the VALU 342. Each vector instruction controls both the ORU 346 and the VALU 342. In combination, the ORU 346 and the VALU 342 allows the processor P to simultaneously execute software using flexible operand routing and multiple operation. Referring to the flow graph of FIG. 13, for example, the VALU 342 operates on the nodes and the ORU 346 implements diagonal interconnections. Thus, because vector arithmetic of different types and data movement can be processed in groups simultaneously, the VALU 342 and the ORU 346 provide high performance.

The VALU 342 can perform a variety of operations, including addition, subtraction, multiply, multiply/accumulate, shifting and logical functions. The VALU 342 assumes that each of the 160-bit registers 344 is partitioned into 10-bit or 20-bit source operands and destinations. Thus, the VALU 342 can execute 8 or 16 individual operations per instruction. A three-operand instruction format is supported by the VALU 342: source A, source B, and destination registers for each instruction. Additionally, certain operations, such as multiply/accumulate use the destination as an implied third source operand.

The MEU 320 operates primarily in fixed point operation. The difference between fixed point and integer data is the location of the binary point. In the MEU 320, the binary point is assumed to be to the left of the most significant bit. Numbers in the MEU 320 can be considered as fractions that nominally occupy the range from plus 1 to minus 1. The advantage of this format over the integer format is that the numerical magnitude of the data does not grow with each multiply operation as the product of two numbers in the plus 1 to minus 1 ranges yields another number in the plus 1 to the minus 1 range. Therefore, it is less likely the data will need to be rescaled.

The MEU 320 takes advantage of the full 80-bit width of the FPU 322 register set. The MEU 320 loads data from memory in 8-bit or 16-bit quantities, but the data is expanded to 10 bits or 20 bits as it is placed into the vector registers 344 (V0 . . . V3). The extended provision provides two benefits: (1) simplifying support for signed and unsigned data; and (2) helping to avoid overflow conditions and round-off errors on intermediate results.

Furthermore, the VALU 342 performs all arithmetic operations using saturating arithmetic. Saturating arithmetic differs from the more familiar modular arithmetic when overflows occur. In modular arithmetic, a positive value that is too large to fit into destination wraps around and becomes very small in value. However, in saturating arithmetic, the maximum representable positive value is substituted for the oversized positive value. This operation is often called clipping.

Additionally, the VALU 342 performs adds, subtracts and Boolean operations on 10-bit to 20-bit quantities. If the result of an add or subtract is outside of the representable range, the result is clipped to the largest positive or negative representable value. However, Boolean operations are not clipped. Furthermore, the result of the add, subtract, and move operations may optionally be shifted right by one bit before being stored to the destination. This scaling can be used to compensate for the tendency of data magnitude to grow with each add or subtract operation. Multiply operations take two 10-bit or 20-bit signed factors and generate a 19-bit or 39-bit signed product. The least significant 9 or 19 bits of the product are rounded and dropped before stored into the 10-bit or 20-bit destination register. As simple multiply operations typically do not overflow, they do not need to be clipped. However, multiply/accumulate operations do require clipping.

Figure 4:
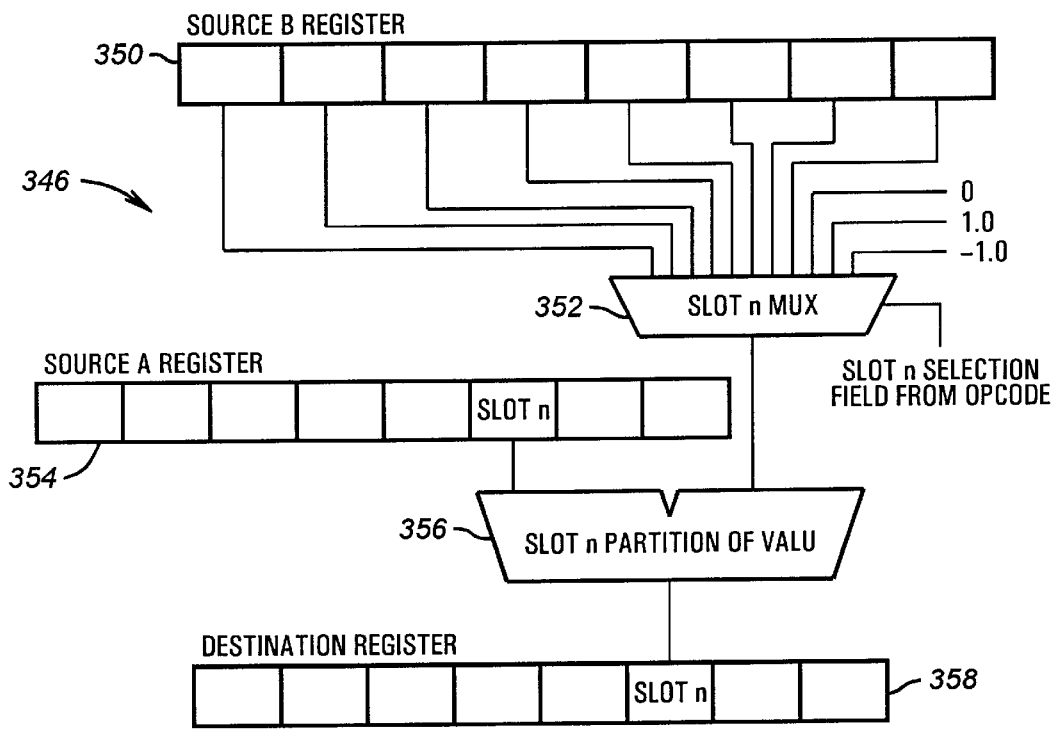
FIG. 4 shows in more detail an operand router unit of FIG. 3.

Turning now to FIG. 4, the details of the operand routing unit 346 are shown. The ORU 346 allows operands to be flexibly moved within and between large 160-bit registers. As vector processors generally must load data from memory in large monolithic chunks, the ability to route operands is useful for the MEU 320. The ability to flexibly access and route individual operands, the ORU 346 provides the ability to "swizzle" the data partitions in a vector register as data moves through it. The swizzling operation allows the operands to be shuffled as needed by the application concurrently with the execution of the vector ALU operations. Thus, a smaller amount of data is required to yield useful results. Thus, the load and store units are less likely to be overloaded, leaving greater bandwidth for the integer, non-vector units to perform work.

As shown in FIG. 4, the ORU 346 is essentially an enhanced 8×8 crossbar switch which works with a plurality of slots. In the preferred embodiment, eight slots are provided for each of a source B register 350, source A register 354 and a destination register 358. The source B register 350 is connected to a multiplexer 352. The output of the multiplexer 352 and the source A register 354 is provided to a VALU partition 356. The VALU partition 356 in turn is connected to the destination register 358.

In the vector source B register 350, each slot contains either one 20-bit partition or two 10-bit partitions, depending on the partition width as specified in the vector instruction. For 10-bit partitions, the MEU 320 simultaneously performs independent but identical operations on the two partitions in a slot. Furthermore, each slot in the destination register 358 can independently receive one of eleven values: the value in one of the eight source slots 350 and 354, a Z value (0), a P value (1) or an N value (−1).

During the execution of codes by the MEU 320, all vector instructions use a single opcode format that simultaneously controls the VALU 342 and the ORU 346. This format is approximately eight bytes long. Each instruction encodes the two source registers, the destination register, the partition size, and the operations to be performed on each partition. In addition, each instruction encodes the ORU 346 routing settings for each of the eight slots. Normally, any two of the vector operations defined in the following table may be specified in a single vector instruction. Each slot can be arbitrarily assigned either of the two operations. The vector instructions offered by the MEU 320 is shown in Tables 1 and 2, as follows:

TABLE 1

Vector Operation Descriptions

| Category | Mnemonic | | Description |
|---|---|---|---|
| Add | add | add_ | Add sourceA and sourceB partitions, place sum in destination. add_ arithmetically shifts the result right by one bit (computes average). |
| Subtract | sub<br>sbr | sub_<br>sbr_ | Subtract partitions. sub does sourceA - source B; sbr does source B - source A. sub_ and sbr_ arithmetically shift the result right by one bit. |
| Accumulate<br>/Merge | acum | acum_ | Add the contents of the destination register partition to the sourceB partition and place the sum in the destination. acum_ arithmetically shift the result right by one bit. |
| Negate | neg | | Negate sourceB partition and place in destination. |
| Distance | dist | | Subtract partitions then perform absolute value. |
| Multiply | mul<br>mac | | mul multiplies the sourceA partition by the sourceB partition and places the product in the destination. mac multiplies sourceA by source B and adds the product to the destination. |
| Conditional<br>Move | mvz<br>mvgez | mvnz<br>mvlz | Conditionally move partition in sourceB register to partition in destination register depending on sourceA partition's relationship to zero. |
| Scale | asr n<br>asl n | | Arithmetically shifts the operand in sourceB by amount n. N can be between 1 and 4 inclusive. asl uses saturating arithmetic and shifts zeros in from the right. asr copies the sign bit from the left. |
| Logical<br>Shift | lsr n<br>lsl n | | Logically shifts the operand in sourceB by amount n. N can be between 1 and 4 inclusive. Zeros are shifted in from the left or right. lsl uses modulo arithmetic; it does not clip. |
| Boolean | false nor<br>bnota<br>nota anotb<br>notb<br>xor nand and<br>nxor b<br>borna<br>a aornb or<br>true | | Perform one of sixteen possible Boolean operations between sourceA and sourceB partitions. (The operations are listed in order of their canonical truth table representations.) |
| Round | rnd n | | Add the constant (1*LSb << n−1) to sourceB, then zero out the n lowest bits. n can be between 1 and 4 inclusive. Implements "round-to-even" method: If (sourceB $<n:0>$ == 010...0), then don't do the add. |
| Magnitude<br>Check | mag | | This operation can be used to implement block floating point algorithms. If the number in sourceB has fewer consecutive leading 1's or 0's than the number in sourceA, then sourceB is placed in the destination; otherwise sourceA is placed in the destination. Only the eight leftmost bits of the values are used in the comparison; if both sourceA and sourceB start with a run of more than 7 bits, then the result is the value from sourceA. This operation is an approximation of the "C" statement: (abs(sourceA) <= abs(sourceB)) ? sourceA : source B. |
| SourceA<br>Partition<br>Shift | pshra | | For each slot s, copy the contents of slot s + 1 from the sourceA register to slot s in the destination register. (If this operation is used in slot 7, then the result is immediate zero). This operation can be used to efficiently shift data inputs and outputs during convolutions (FIR filters, etc.). |
| Slot<br>Routing | blbh<br>ahbh<br>albl | | These operations are defined only for 20-bit partitions. They are used to route 10-bit data across the even/odd "boundary" that the ORU doesn't cross. blbh swaps the upper and lower halves of the sourceB operand and places the result in the destination. ahbh concatenates the upper half of the sourceA with the upper half of sourceB. albl concatenates the lower half of sourceA with the lower half of sourceB. |
| Store<br>Conversion | ws2u | | This operation is used prior to storing 16-bit unsigned data from a 20-bit partition. If bit 19 of sourceB is set, the destination is set to zero. Otherwise, this operation is the same as lsl 1. |
| Extended-<br>Precision | emach<br>emacl<br>emaci<br>carry | | These operations are used to perform multiply-and-accumulate functions while retaining 36 bits of precision in intermediate results; they are only defined for 20-bit partitions. emach is the same as mac, except that no rounding is done on the LSb. emacl multiplies sourceA and sourceB, then adds bits $<18:3>$ of the 39-bit intermediate product to bits $<15:0>$ of the destination, propagating carries through bit 19 of the destination. emaci is similar to emacl, except that bits $<19:16>$ of the destination are cleared prior to the summation. The carry operation logically shifts sourceB right by 16 bits, then adds the result to SourceA. |

TABLE 2

Operation Synonyms

| Category | Alias Name | Actual Operation | Description |
|---|---|---|---|
| Move SourceB | mov<br>mov_ | b<br>asrl | Move the sourceB register partition to the destination partition. mov_ arithmetically shifts the results right by one bit. |
| Move SourceA | mova | a | Copy the partition in sourceA to the destination. |
| SourceA Absolute Value | absa | dist (. . Z . .) | Compute the absolute value of the sourceA partition. |
| Unmodified Destination | dest | acum (. . Z . .) | Leave the destination partition unchanged. |
| Average | avg | add_ | Compute average of two values. |

Turning now to load and store instructions, each type of operation has two versions: one that moves 16 bytes of memory and one that moves 8 bytes of memory. The 8-byte versions are defined because this is often the amount of data needed; loading or storing 16 bytes in these cases would be wasteful. Further, the 8-byte loads and stores can be used to convert between byte-precision data and word-precision data. The 16-byte loads and stores operate on the entire 160-bit vector register. The 8-byte stores for 20-bit partitions store only the values from slots 4 through 7. The 8-byte stores for 10-bit partitions store only the upper half of each of the eight slots. The 8-byte loads for 20-bit partitions load the memory data to slots 4 through 7; slots 0 through 3 are set to zero. The 8-byte loads for 10-bit partitions load the memory data to the upper half of each slot; the lower half of each slot is set to zero. Even though 8-byte loads only copy memory to half of the bits in a vector register, the entire 160-bit vector register is updated by padding the unused partitions with zeros. This feature greatly simplifies the implementation of register renaming for the MEU because partial register updates do not occur. Table 3 illustrates the load and store instructions in more detail:

TABLE 3

Load and Store Instruction Descriptions

| Instruction Type | Mnemonic Format | Description |
|---|---|---|
| 16-Byte, 20-Bit Load | vldw vd, mem128 | Load destination register vd with 16 bytes of signed 16-bit data at address mem128. |
| 8-Byte, 20-Bit Load | vldw vdh, mem64 | Load slots 4 through 7 of destination register vd with 8 bytes of signed 16-bit data at address mem64. Set slots 0 through 3 of vd to zero. |
| 16-Byte, 10-Bit Load | vldb vd, mem128 | Load destination register vd with 16 bytes of unsigned 8-bit data at address mem128. Data is loaded using a 2:1 byte interleave pattern. |
| 16-Byte, 10-Bit Load | vldb vdh, mem64 | Load destination register vd with 8 bytes of unsigned 8-bit data at address mem64. The upper half of each slot receives the memory values; the lower half of each slot is set to zero. |
| 16-Byte, 20-Bit Store | vstw mem128, vs | Store source register vs to 16 bytes of signed 16-bit data at address mem128. |
| 8-Byte, 20-Bit Store | vstw mem64, vsh | Store slots 4 through 7 of source register vs to 8 bytes of signed 16-bit dat at address mem64. |
| 16-Byte, 10-Bit Store | vstb mem128, vs | Store source register vs to 16 bytes of unsigned 8-bit data at address mem128. Data is stored using a 2:1 interleave pattern. |
| 16-Byte, 10-Bit Store | vstb mem64, vsh | Store source register vs to 8 bytes of unsigned 8-bit data at address mem64. The upper half of each slot is stored to memory; the lower half of each slot is ignored. |

The mnemonics for the vector instruction need to specify the operations to perform on each partition as well as the sources, destination and ORU routing. This is notated as follows:

{sbr sbr add add sbr add sbr add} word V3, V2, V1(37P3Z1N2)

This instruction performs adds and reverse subtracts. V3 is the destination; V2 is sourceA; V1 is sourceB. The slots for the operand specifier and the routing specifier are laid out in decreasing order from left to right.; slot 7 and 6 get sbr, slot 5 gets add, and so forth. The "word" symbol specifies that the instruction works on a 20-bit partitions. The routing specifier for sourceB is set for the following (the number after the points specify slot numbers):

dest.7<==−sourceA.7+sourceB.3
dest.6<==−sourceA.6+sourceB.7
dest.5<==sourceA.5+#1.0
dest.4<==sourceA.4+sourceB.3
dest.3<==−sourceA.3+#0.0
dest.2<==sourceA.2+sourceB.1
dest.1<==−sourceA.1+#−1.0
dest.0<==sourceA.0+sourceB.2

Before turning to the details of the multimedia extension unit implemented motion compensation routine for reconstructing motion compensated frames using MPEG decoding, a brief understanding of the basics of such reconstruction is helpful. The motion compensation technology for MPEG is generally known to the art, for example, through the MPEG Software Simulation Group, which has provided a number of publicly available programs for implementing this technology.

Figure 5:
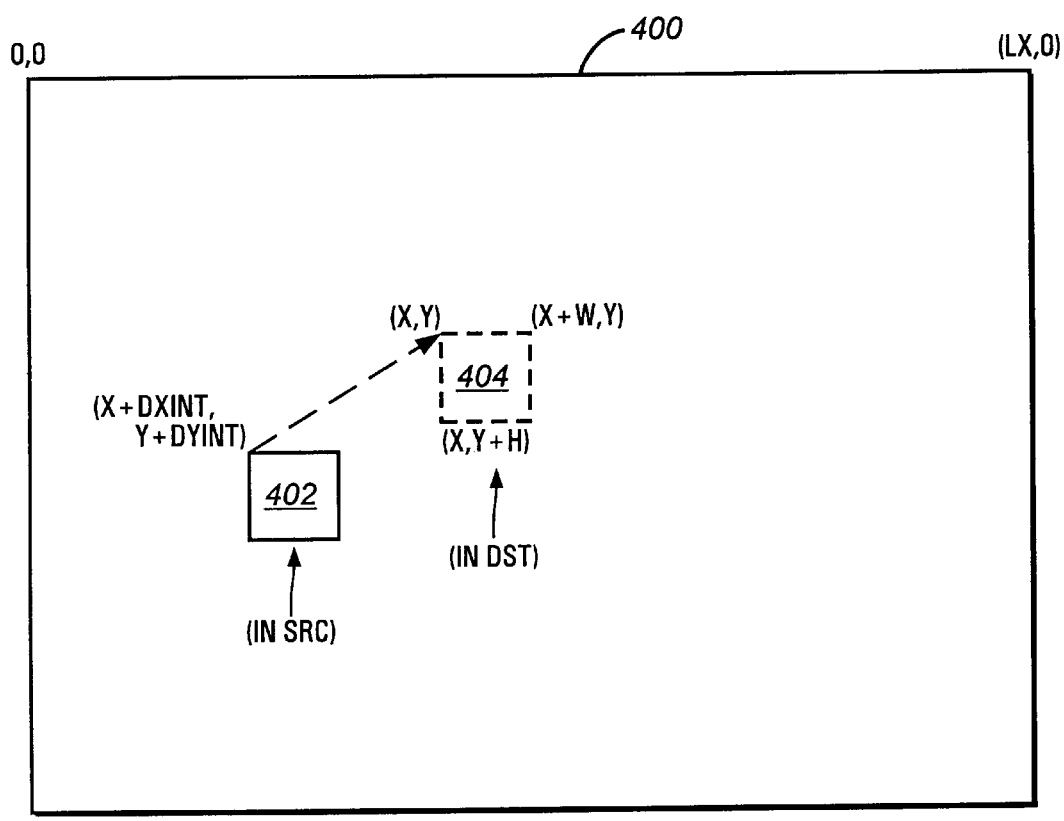
FIG. 5 is a diagram illustrating motion compensation as used according to the MPEG standard.

Referring to FIG. 5, shown is a frame 400 for illustrating the motion compensation implemented on a multimedia extension unit according to the invention. First, in MPEG, the standard display element is a "pel," which is composed of three component sample values—a luminance component and two chrominance components. A basic unit in the frame 400 is a "macro block," which is composed of a 16×16 array of luminance components, and two 8×8 arrays of chrominance components. Thus, there are four luminance components for each chrominance component. A frame, such as the frame 400, is generally stored sequentially in memory. A frame can be interlaced with two fields making up the frame. The elements beginning at the top lefthand corner at 0,0 are stored sequentially to the horizontal end of the frame (LX,0). The next row is then sequentially stored from (0,1) to (LX,1) and so-on until the entire frame has been stored. Generally, the macroblocks are stored separately for the luminance values and chrominance values. In the discussion to follow, a routine MEURECON_COMP 500 (see FIG. 6) is called separately for the luminance values and the chrominance values, with appropriate settings (8×8 versus 16×16 elements blocks) set for each.

Further, referring to FIG. 5, illustrated are a number of variables used in the calls to MEURECON_COMP 500. In reference to that routine, it is assumed both a source and destination buffer are present in memory. In the source buffer, a source block 402 is shown, and in the destination buffer, a destination block 404 is shown. Variables X and Y designate the current location in the destination buffer that is the start of the current macroblock. The width of the current macro block is W, and its height is H. Variables DX and DY designate the motion vector, and the starting location of the source macroblock that will be used for motion compensation is (X+DXINT, Y+DYINT) within the source buffer. Other variables associated with MPEG are used to handle interlaced video and to address the type of motion compensation that is being used for a particular motion vector. These will be understood by those skilled in the art of MPEG design. As a further note, DX and DY, as illustrated in FIG. 5, are actually the integer portions of X and Y of the motion vector. This is because MPEG provides for one-half bit resolution compensation. That is, the source macroblock for motion compensation can be designated to be between the actual pels within the source buffer. This, too, will be appreciated by those skilled in the art of MPEG decoding.

Motion compensation in MPEG can be forward only or forward and backward in time. If forward and backward, typically the forward and backward values are averaged. The MEURECON_COMP routine 500 is general enough so that when called by a general MPEG reconstruction routine, it can perform these different compensation techniques.

Figure 6:
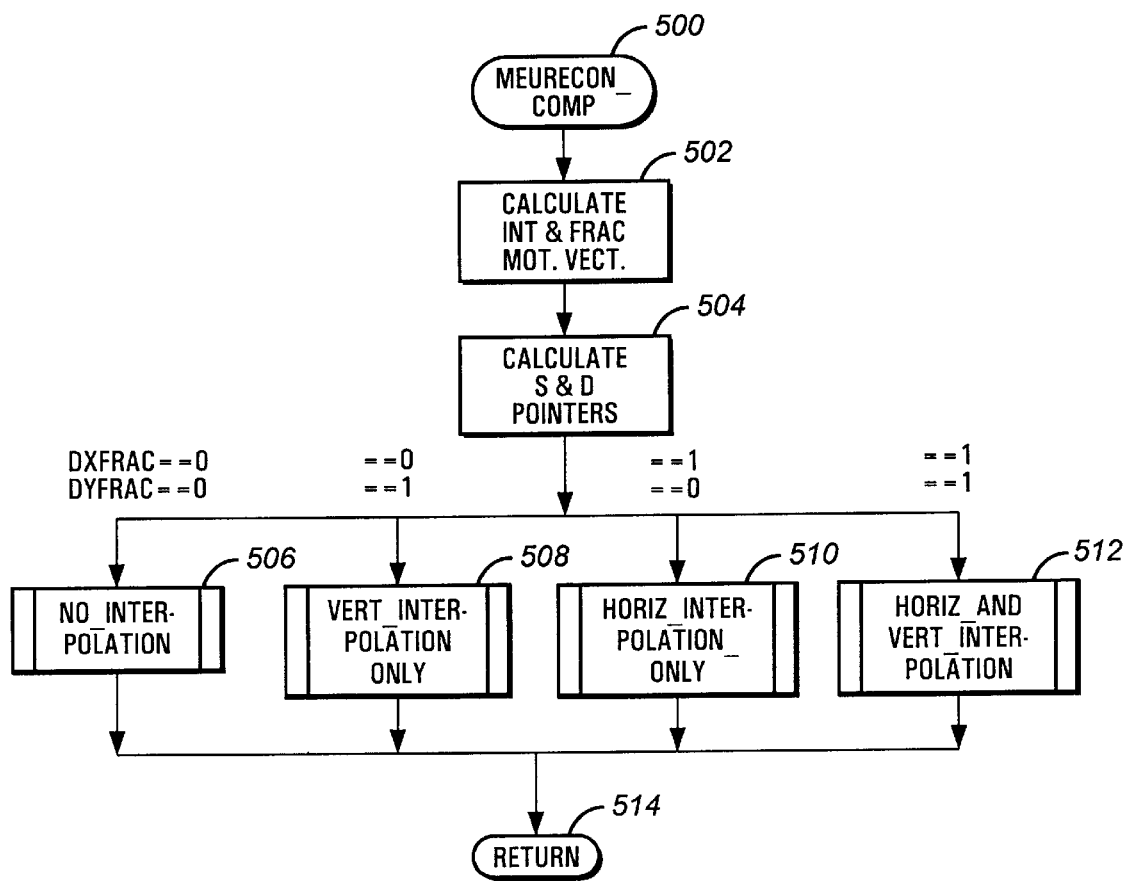
FIG. 6 is a flowchart illustration of a MEURECON_COMP routine for motion compensation according to the invention.

With this background in mind, FIG. 6 shows the technology implemented according to the invention on a multimedia extension unit. FIG. 6 is a flowchart illustration of the MEURECON_COMP routine 500, which corresponds to the MEURECON_COMP routine in the attached source code appendix. The steps illustrated by the blocks of the flowcharts that follow are correspondingly labeled in the source code appendix. At step 502, the integer and fractional portions of the motion vector are separated. This allows the integer portion to be used to established the appropriate source macroblock, while the fractional portions will be used to determine if interpolation in that source according to the invention will be needed. Specifically, DXINT and DYINT designate the integral portion of the motion vector, while DXFRAC and DYFRAC designate the one-bit fractional portions.

Turning to step 504, the pointers to the locations within the source and destination buffers of the macroblocks that will be used are calculated. First, a source macroblock pointer S is calculated to be equal to SRC+LX·(Y+DYINT)+X+DXINT. It will be understood that this is an appropriate offset for the appropriate row (LX·(Y+DYINT)) plus the offset within that row, (X+DXINT). Then, a destination macroblock pointer D is calculated to be equal to DST+LX·Y+X.

The fractional portion of motion vectors, DXFRAC and DYFRAC are then analyzed to determine if source interpolation will be used in either the x or y direction. If the fractional portion of DX is non-zero, then horizontal interpolation will be needed. If the fractional portion of DY is non-zero, vertical interpolation will be needed. Based on these comparisons, one of four routines is executed. These routines appropriately move, interpolate, and average the source and destination microblocks. The first of these is a NO_INTERPOLATION routine 506, the next is a VERT_INTERPOLATION_ONLY routine 508. The next is a HORIZ_INTERPOLATION_ONLY routine 510, and finally a HORIZ_AND_VERT_INTERPOLATION routine 512. These are discussed below in conjunction with FIGS. 7 and 11A and 11B. Specifically, the vector manipulation is illustrated in detail for the HORIZ_INTERPOLATION_ONLY routine 510, and further details are illustrated in conjunction with the VERT_INTERPOLATION_ONLY routine 508. The NO_INTERPOLATION and HORIZ_AND_VERT_INTERPOLATION routines 506 and 512 will be understood from the detailed descriptions of the other two routines.

After the macroblock motion compensation is complete, the routine exits at FIG. 514, returning to calling MPEG routines, which proceed with further motion compensation and frame reconstruction until the frame is entirely constructed, at which point it is displayed on a video screen.

Figure 7:
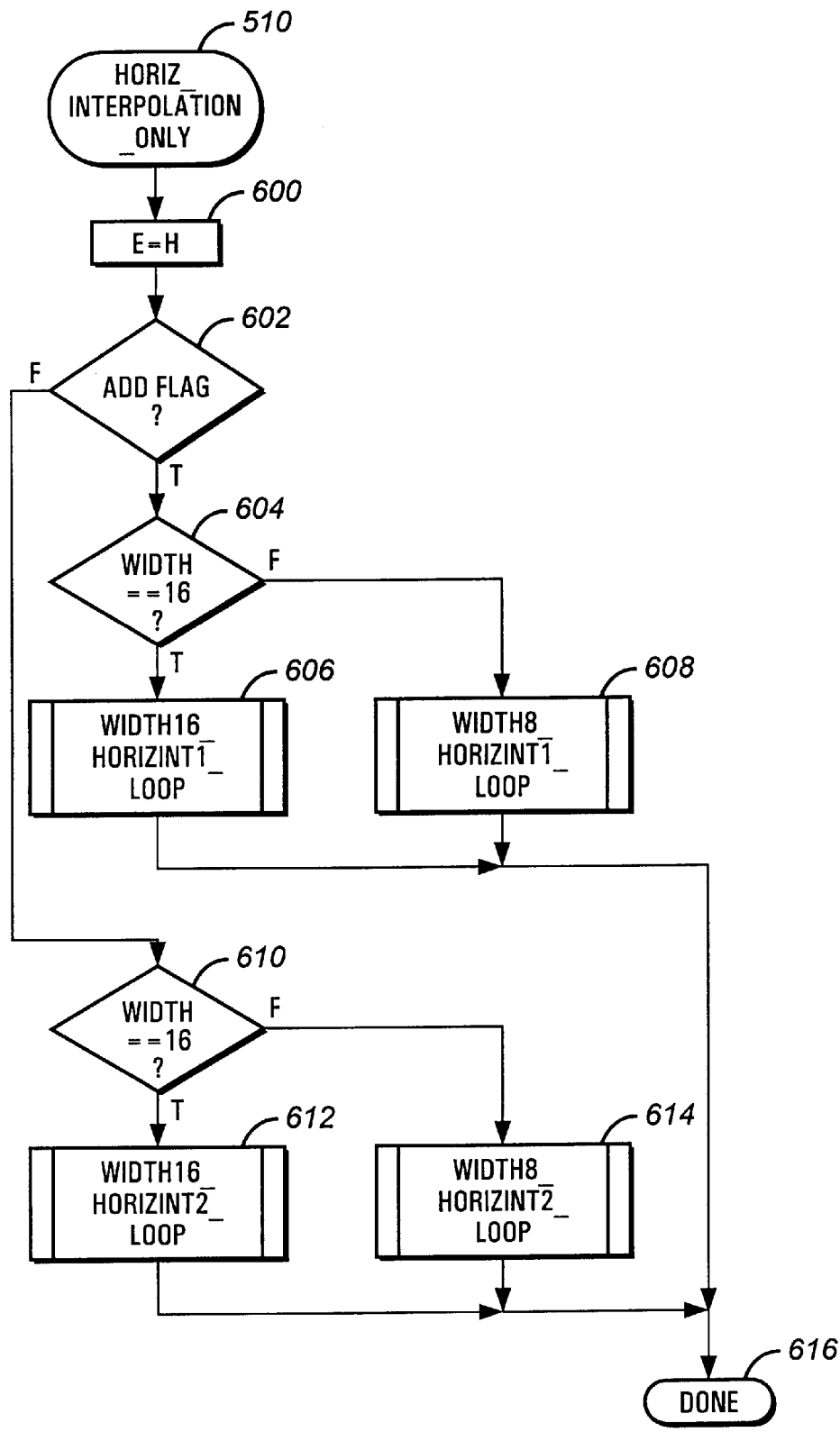
FIG. 7 is a flowchart illustration of a HORIZ_INTERPOLATION_ONLY routine used in the routine of FIG. 6.

Turning to FIG. 7, details of the HORIZ_INTERPOLATION_ONLY routine 510 are shown. Beginning at step 600, a variable E is set equal to the height of the current macroblock, which would be 8 for a chrominance block or 16 for a luminance block. Proceeding to step 602, it is determined whether the reconstruction is to be done by averaging the source macroblock with the destination (ADDFLAG true), or simply a straight copy. Source/destination averaging is desirable in a variety of MPEG techniques, such as dual prime prediction, as one skilled in MPEG implementations will appreciate. If the source macroblock is to be averaged with the destination, control proceeds to step 604, where it is determined whether the width is 16 elements (corresponding to a luminance block) or 8 elements (corresponding to chrominance block). If a 16-element block, control proceeds to step 606, a WIDTH16_HORIZINT1_LOOP routine 606, which performs horizontal interpolation on a 16-element square block. Else, control proceeds to a WIDTH8_HORIZINT1_LOOP routine 608, which performs 8-element square interpolation.

If at step 602 ADDFLAG is false, indicating that the source block is to be copied to the destination block, control proceeds to step 610, where it is determined whether this is to be a 16-element or an 8-element square block copy. If W equals 16, indicating a luminance block, control proceeds to a WIDTH16_HORIZINT2_LOOP routine 612; if an 8-element square chrominance block, control proceeds to a WIDTH8_HORIZINT2_LOOP routine 614. From steps 606, 608, 612, or 614, control returns to the calling MPEG routine at step 616.

Figure 8:
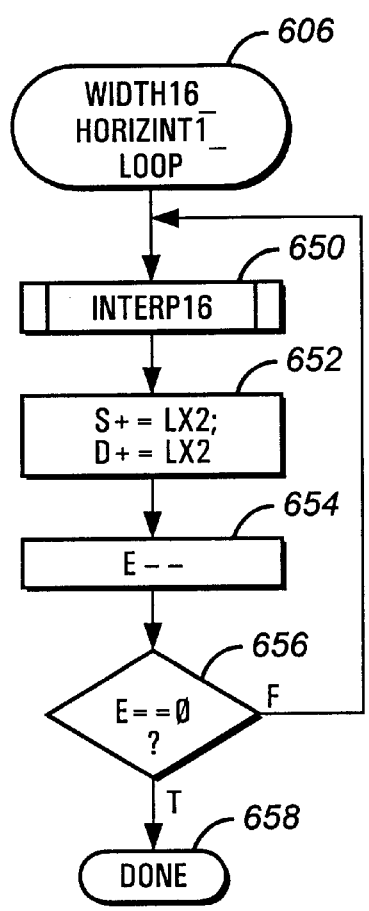
FIG. 8 is a flowchart illustration of a WIDTH16_HORIZINT1_LOOP routine used in the routine of FIG. 7.

Turning to the WIDTH16_HORIZINT1_LOOP routine 606, this is illustrated in FIG. 8. First, parallel vector operations are performed in a step 650, which interpolate adjacent pixels from the source block and averages them with the destination block, yielding a first row in the destination block. This is further discussed below in conjunction with FIG. 9. Proceeding to step 652, both the pointers S and D into the source and destination buffers are incremented by the frame width. This points to the next row of elements in the next row of the frame—that is, into the next row of the block. Proceeding to step 654, E is decremented, and at step 656 if E is not equal to zero, control loops to the beginning of the WIDTH16_HORIZINT1_LOOP routine 606 to interpolate the next row of the source block into the destination block. Else the routine is done at step 658, so control returns to FIG. 7.

Figure 9:
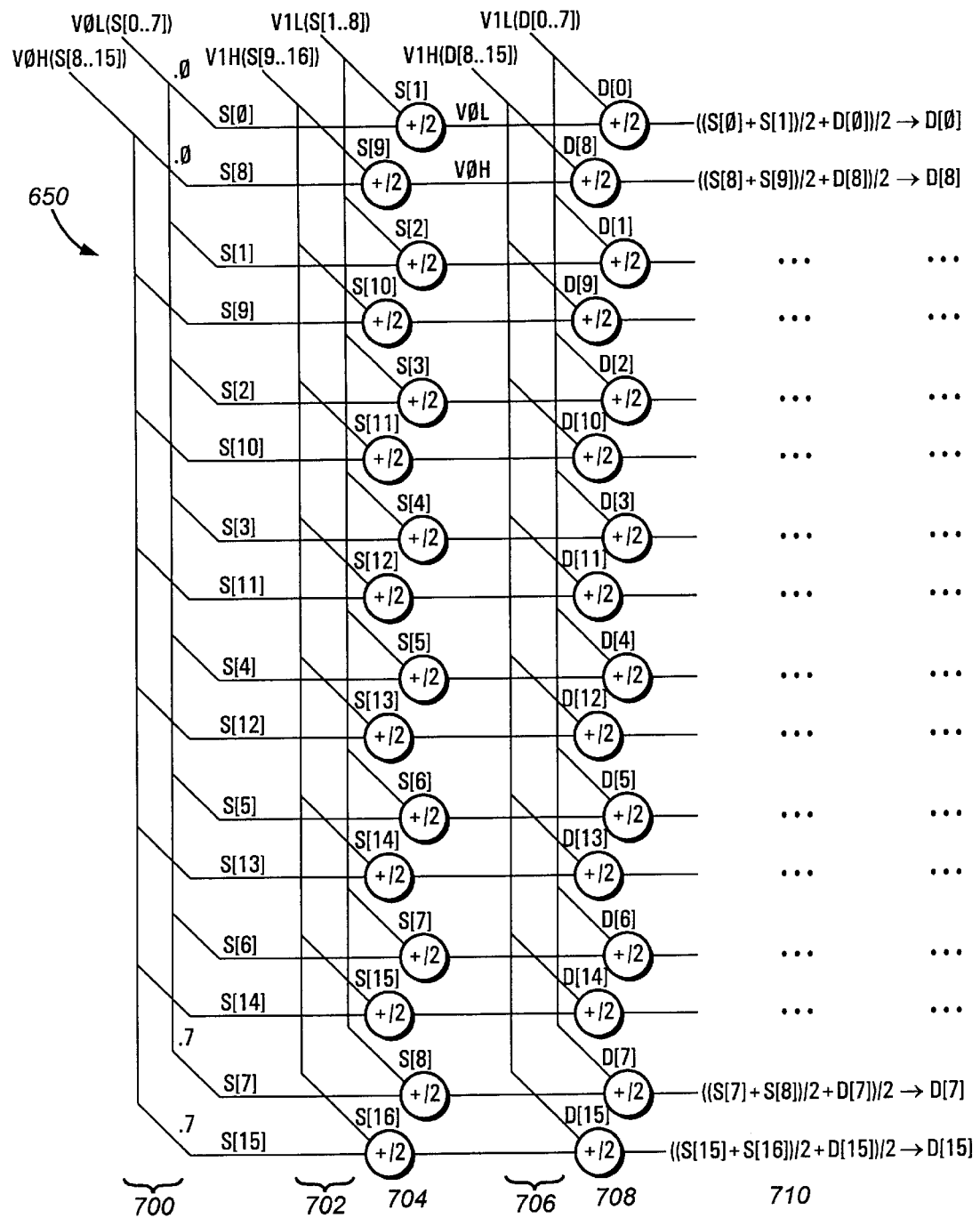
FIG. 9 is a vector flow diagram illustrating source and destination block interpolation and averaging according to the invention.

Turning to FIG. 9, the details of the interpolation step 650 are illustrated. Beginning at step 700, the vector V0 is loaded with S[0 . . . 15]. Specifically, V0L is loaded with S[0 . . . 7] and V0H is loaded with S[8 . . . 15]. Thus, the first row of the source macroblock, where the source is a luminance block, is loaded into V0.

Proceeding to step 702, the vector V1 is loaded with the adjacent elements S[1 . . . 16]. These are the pel components that will be averaged with their adjacent pel components that are loaded in V0. This interpolation is done in step 704, where an add-and-shift instruction is performed. At step 704, S[0] (in slot 0 of V0L) is simultaneously added to S[1] (slot 0 of V1L) and the result divided by two. Thus, in one step, the adjacent source pel components of the first row are averaged and stored in V0. Two instructions are not needed—one suffices. Proceeding to step 706, vector V1 is loaded with the destination pixels D[0 . . . 15]. Then, in step 708, the elements in V1 are averaged with the previously interpolated source pixels held in V0, yielding a result in V0. Again, the averaging takes place in a single step. After step 708, the results are stored in step 710 into the destination buffer at D[0 . . . 15].

As discussed in conjunction with FIG. 8, this sequence is repeated for each block row within the source and destination buffers. It will be appreciated that a single instruction is used to interpolate the source pel components, and that in a single instruction they are in turn averaged with the destination pel components.

The WIDTH8_HORIZINT1_LOOP routine 608 is similar to the WIDTH16_HORIZINT1_LOOP routine 606, but instead of 16 bytes being loaded and then stored, only 8 bytes are loaded and stored. Referring to FIG. 9, only the high portion of each vector is used, loading V0H with S[0 . . . 7]; loading V1H with S[1 . . . 8]; averaging the two; and then averaging with D[0 . . . 7], contained in V1H. It will be understood that this is appropriate for 8-element width source and destination blocks used for chrominance.

Figure 10:
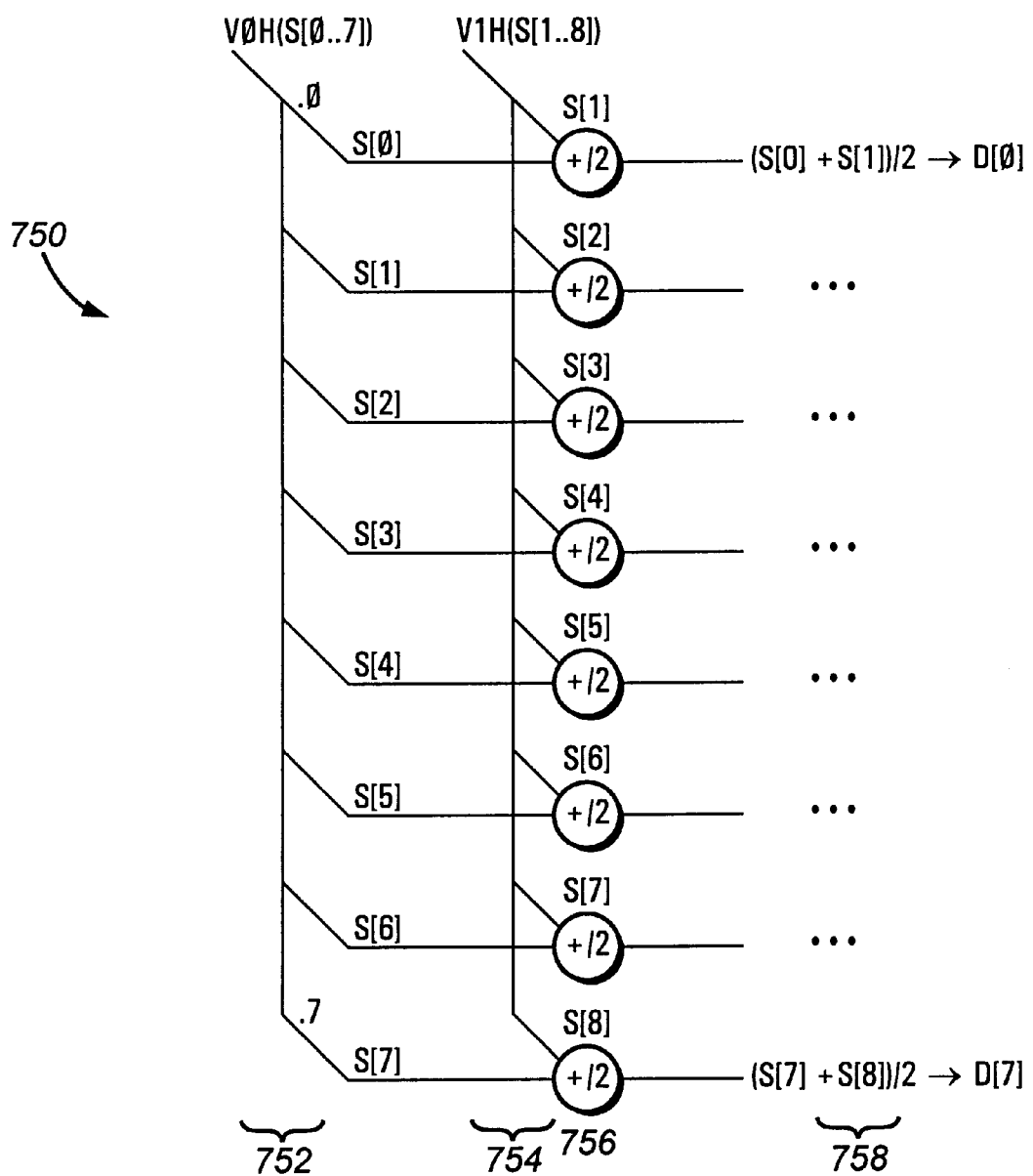
FIG. 10 is a vector flow diagram illustrating the source block interpolation according to the invention.

Turning to the WIDTH8_HORIZINT2_LOOP routine 614, this routine both illustrates the difference between the 8-element square versus 16-element square processing discussed above and the difference between copying the interpolation source to the destination instead of averaging the source and destination elements. The WIDTH8_HORIZINT2_LOOP routine 614 is identical to the WIDTH16_HORIZINT1_LOOP routine 606 of FIG. 8, except that step 650 is replaced by an INTERP8 series of instructions 750, which are illustrated in FIG. 10. The INTERP8 series of instruction only load V0H with S[0 . . . 7], as compared to FIG. 9 where S[0 . . . 15] were loaded into V0.

In FIG. 10, V0H.0 to V0H.7 are loaded with S[0 . . . 7] at step 752 and V1H is loaded with S[1 . . . 8] in step 754. These are then simultaneously summed and divided by two, (that is, averaged), in step 756, yielding an interpolated result, which is then saved in step 758 to the destination buffer at D[0 . . . 7]. That is, the effect of the ADDFLAG is that when false, as in the routine 614, the source data is averaged with adjacent source data and directly saved to the destination buffer in the appropriate position. In additive routines, such as routines 606 and 608, the source data is averaged with the adjacent source data, and then averaged into the destination data.

Figure 11A:
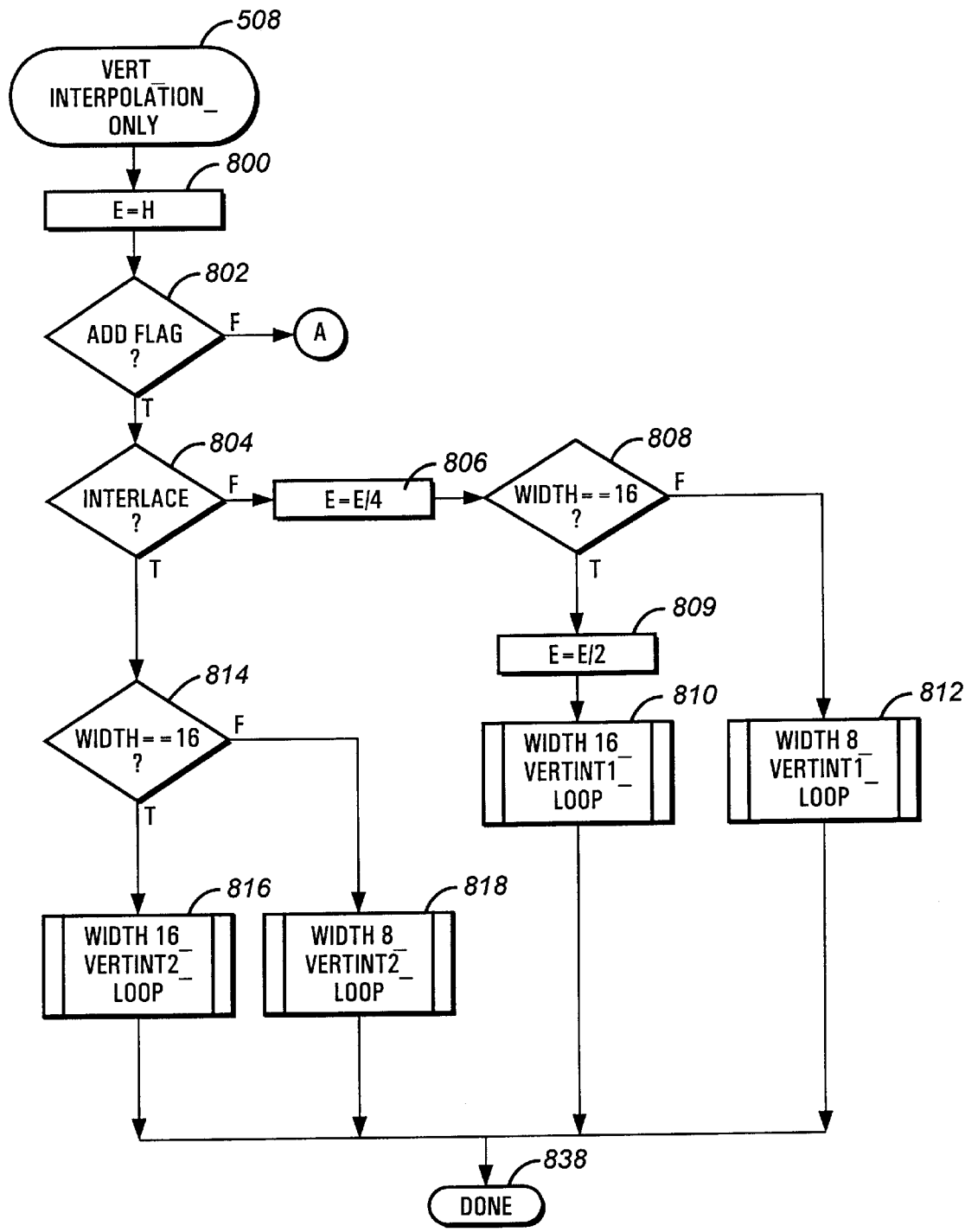
FIGS. 11A and 11B are flowchart illustrations of a VERT_INTERPOLATION_ONLY routine implemented in the routine of FIG. 6.
Figure 11B:
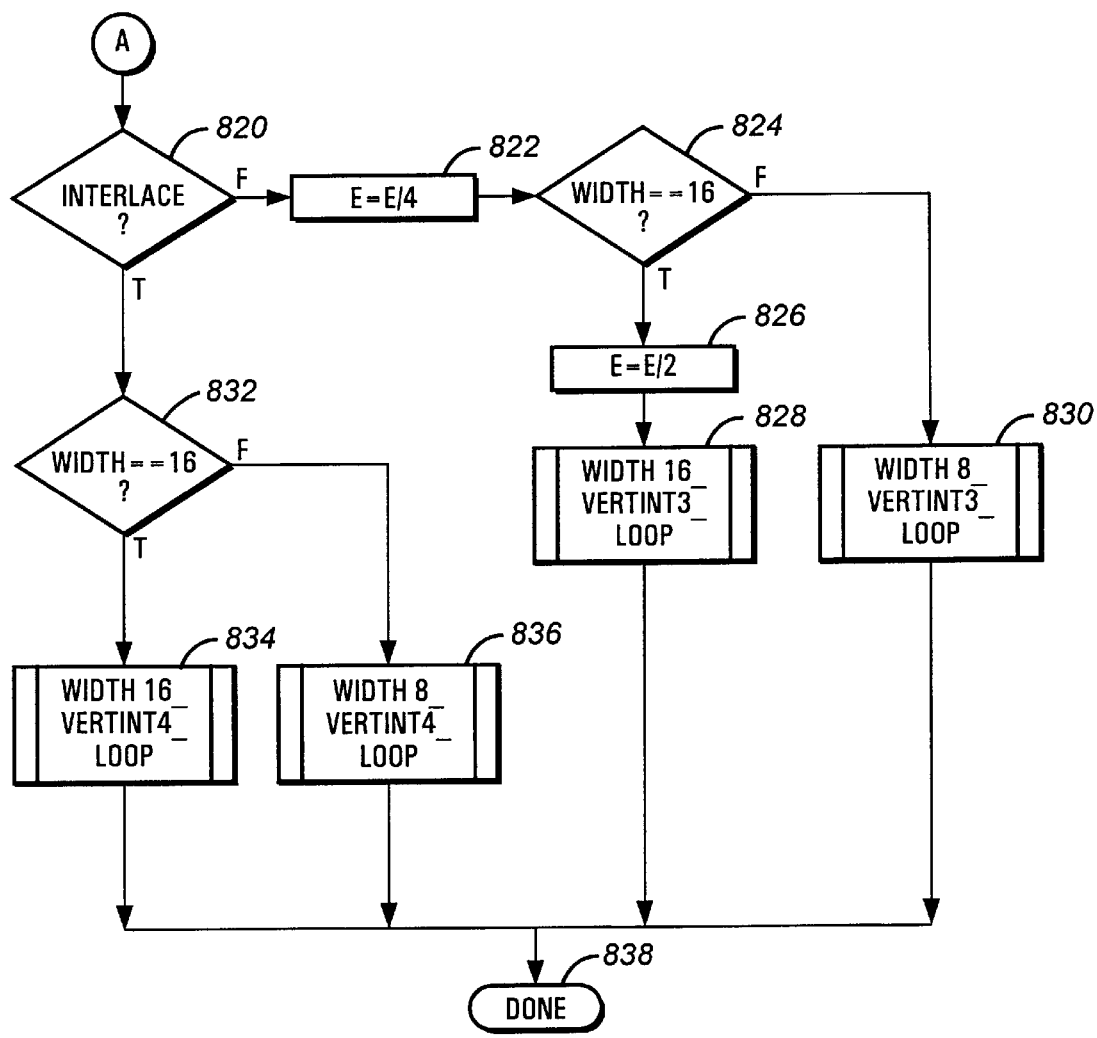

Turning to FIGS. 11A and 11B, flowcharts of the VERT_INTERPOLATION_ONLY routine 508 is shown. This routine is in most respects similar to the HORIZ_INTERPOLATION_ONLY routine 510, except that instead of horizontally adjacent pel components being averaged, vertically adjacent pel components are averaged. Further, the vertical row relationship permits an efficiency of loading in certain circumstances, specifically when non-interlaced frames are being employed. Many steps are equivalent to the corresponding steps discussed in conjunction with FIG. 7, and reference is made of that figure for additional details.

Beginning at step 800, the variable E is loaded with the block height H. Proceeding to step 802, it is determined whether ADDFLAG is true, indicating whether the interpolated source pixels will be averaged with the destination pixels, or instead simply copied to the destination pixels. If ADDFLAG is true, control proceeds to step 804, where it is determined whether interlaced frames are being employed. This is determined by comparing the variable LX with the variable LX2. LX2 is equal to 2 times LX (or 2 times the frame width), for interlaced frames and is equal to LX for non-interlaced frames. If a non-interlaced frames are being used, control proceeds to step 806, where E, the loop count, is divided by 4. This is done because for non-interlaced frame, the loading efficiency permits multiple rows to be vertically interpolated per pass. This is understood in conjunction with the WIDTH16_VERTINT1_LOOP routine 810 discussed below in conjunction with FIGS. 12 and 13. Proceeding to step 808, it is determined whether the width is 16, corresponding to a luminance block. If so, control proceeds to step 809, where E is further divided by 2. This is because for 16-element square vertical interpolation, 8 rows are vertically interpolated per pass, whereas with 8-element square vertical interpolation, 4 rows are interpolated per pass.

Proceeding to step 810, the routine WIDTH16_VERTINT1_LOOP routine 810 is executed. This is discussed in conjunction with FIGS. 12 and 13, but to summarize, it averages the first row with the second row of the source block, and then averages the result with the first row of the destination block. Then, it averages the previously loaded second row with the third row of the source block, and then averages the result with the second row of the destination block. It repeats in a "flip-flopping" action, interpolating rows 0 to 8, yielding destination block rows 0 to 7.

If at step 808 the width is not 16, then the width is 8, indicating a chrominance block, so control proceeds to step 812 where a WIDTH8_VERTINT1_LOOP routine 812 is executed, which operates similarly to the WIDTH16_VERTINT1_LOOP routine 810, but only 4 rows are vertically interpolated at a time.

Returning to step 804, if the encoding is interlaced, control proceeds to step 814. From step 814, it is determined whether the width is equal to 16, indicating a luminance block, and if so, control proceeds to step 818 where a WIDTH16_VERTINT2_LOOP routine 816 is executed. Otherwise, if the width is 8, control proceeds to step 818, where a WIDTH8_VERTINT2_LOOP routine is executed. Both the WIDTH16_VERTINT2_LOOP routine 816 and the WIDTH8_VERTINT2_LOOP routine 818 only interpolate one source block row with the next source block row and then add to the destination block row at a time. That is, they do not use the "flip-flop" loading of the routines 810 or 812.

Returning to step 802, if ADDFLAG is false, control proceeds to step 820. Then, a series of steps 820–836, corresponding to the steps 804–818, are executed. The difference between the steps 820–836 and steps 804–818 is that the source rows are not averaged with the destination rows, but are simply copied to the destination rows. This has been discussed above in conjunction with the HORIZ_INTERPOLATION_ONLY routine 510 of FIG. 7. From the loops 810, 812, 816, 818, 828, 830, 834, and 836, the routine 508 returns to its calling routine in a done step 838.

Figure 12:
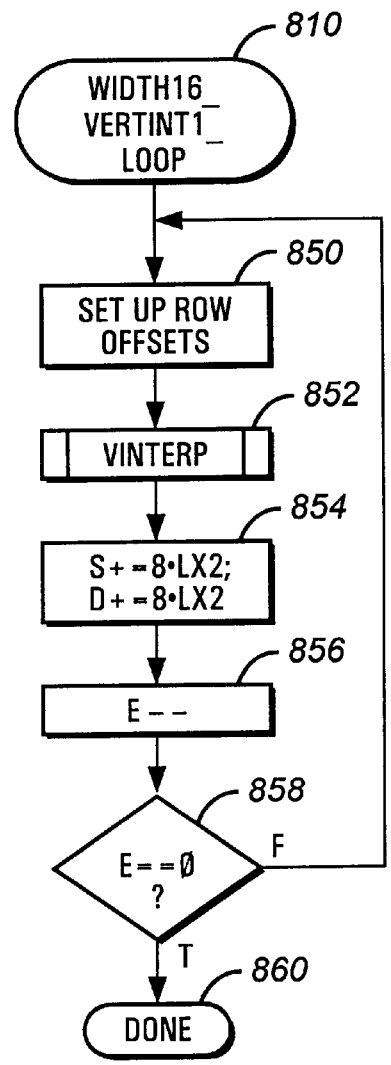
FIG. 12 is a flowchart illustration of a WIDTH16_VERTINT1_LOOP routine implemented in the routine of FIGS. 11A and 11B.

Turning to FIG. 12, a flowchart of the WIDTH16_VERTINT1_LOOP routine 810 is shown. This is similar to the WIDTH16_HORIZINT1_LOOP routine 606.

However, beginning with a step 850, a series of row offsets are initially established. This is done by initially establishing multiples of LX2, which will be used as offsets into each of the first 9 rows of the source block pointed to by S, which will then be used to generate the first 8 destination rows D.

Figure 13:
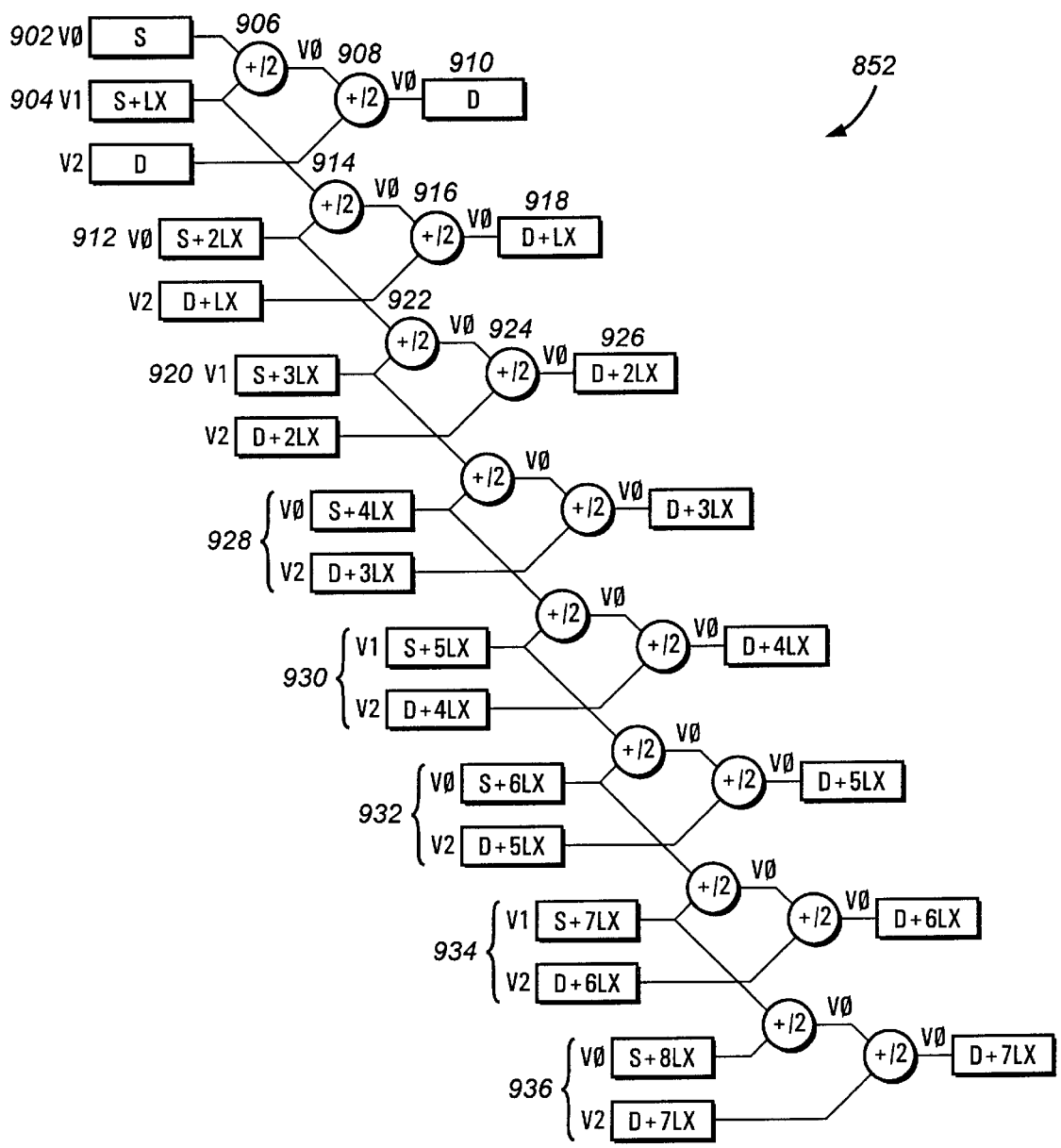
FIG. 13 is a vector flow diagram of the parallel interpolation employed in FIG. 12.

Proceeding to step 852, a series of instructions V1NTERP are executed, as discussed below in conjunction with FIG. 13. These instructions perform the interpolation among the first 9 rows of the source block S, and average those interpolated results with the first 8 rows of the destination block D.

Control then proceeds to step 854, where the source block S is incremented by 8 times LX2, and the same is done for the destination block. After this step, S points to the next 8 rows of the source block and D points to the next 8 rows of the destination block.

Proceeding to step 856, E is decremented and compared to zero in step 858. If E is not zero, additional rows remain to be interpolated, so control loops to step 850. Otherwise, the vertical interpolation is complete, so the routine 810 returns to the calling routine at step 860. Of note, in step 860 this would return to whatever routine called the MEURECON_COMP routine 500.

The WIDTH16_VERTINT1_LOOP routine 810 is illustrative of the other loops in FIG. 12. In FIG. 13, instead of horizontally adjacent elements, adjacent rows are averaged and then averaged into the destination buffer. But during vertical interpolation, since after the first and second source rows are averaged the second row remains loaded into a vector, it does not need to be reloaded. This is understood in conjunction with FIG. 13 and the source code appendix. In step 902, V0 is loaded with the first row of the source block designated by the pointer S, and in step 904, V1 is loaded with the next row of the source block designated by S+LX. Again, LX is the frame width, so adding the frame width to S yields the start of the next row of block. Then, the first and second rows are averaged in a step 906, which both adds V0 and V1 and divides them by two simultaneously, yielding the interpolated result in V0. This result is then averaged with the first row of the destination block, which has been loaded into V2 in a step 908. The result is then stored in step 910 to the first row of the destination block.

Proceeding to step 912, V0 is loaded with S+2·LX, which is the third row of the source macroblock. This is averaged with V1 in step 914, because V1 was previously loaded with the second row of the source block in step 904, so there is no need to again load this row. The result of this average is stored in V0, and is averaged with the second row of the destination block in step 916 and then stored in step 918. Proceeding to step 920, this time V1 is loaded with the fourth row of the source block and averaged with V0, which contains the third row of the source block, in step 922. The result is then averaged in step 924 with the third row of the destination macroblock and stored as that third row in step 926. This is repeated for a series of instructions 928, 930, 932, 934, and 936. It will be understood that alternately either V0 or V1 is loaded with the next row of the source block and then averaged with the other vector, which contains the preceding row. This increases efficiency of loads because each row need be loaded only a single time.

It will be appreciated that the previous discussions of the WIDTH16_VERTINT1_LOOP routine 810, the WIDTH16_HORIZINT1_LOOP routine 606, and the WIDTH8_HORIZINT2_LOOP routine 614 illustrate the basic elements used for the other combinations of vertical and horizontal interpolation. The HORIZ_AND_VERT_INTERPOLATION routine 512 interpolates in both directions, and the NO_INTERPOLATION routine 506 does no interpolation, but instead either directly copies the source to the destination or averages the source with the destination. It will be appreciated by those skilled in the art how the elements of the above routines are used to create the other permutations.

As will be appreciated by those skilled in the art, the MEURECON_COMP routine is useful within video decompression for ultimate display on a video monitor. It provides a high speed method to reconstruct video frames for display using standard MPEG format. That is, it can be used to display MPEG video through the video card 122 and on the screen 124. Further, the MEURECON_COMP routine could be stored on the disk 118, in the ROM 112, in the RAM 114, on a CD ROM for the CD-ROM player 119, or other media.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of providing MPEG motion compensation using interpolation of a source block in a computer system, the method comprising the steps of:

providing a vector processing unit with vector operand routing, multiple operations per instruction, and an add and divide instruction that adds two vector registers and divides the result in a single instruction;

loading a first vector register with a first plurality of elements from the source block;

loading a second vector register with a second plurality of elements adjacent to the first plurality of elements; and performing the add and divide instruction on the first and second vector register yielding interpolated source elements in a result vector register.

2. The method of claim 1 wherein the result vector register is either the first or second vector register.

3. The method of claim 1 further comprising the step of:
   storing the interpolated source elements to a destination block.

4. The method of claim 3 further comprising the steps of:
   loading a destination vector register with a plurality of destination elements from a destination buffer;
   performing the add and divide instruction on the result vector register and the destination vector register yielding a source-destination averaged result;
   storing the source-destination averaged result to the destination buffer.

5. The method of claim 1, wherein the first plurality of elements are horizontally adjacent to the second plurality of elements.

6. The method of claim 1, wherein the first plurality of elements from a first row are vertically adjacent to the second plurality of elements from a second row.

7. The method of claim 6 further comprising the steps of:
   loading the first vector register with a next row from the source block;
   performing the add and divide instruction on the second and first vector registers yielding a next plurality of interpolated source elements.

8. The method of claim 7 further comprising the step of:
   alternating the loading of the first and second vector registers with a new next row from the source block and repeating the performing step for a plurality of rows.

9. The method of claim 1, wherein the divide is a divide by two.

10. A computer system for providing MPEG motion compensation, the system comprising:

a vector processing unit with vector operand routing, multiple operations per instruction, and an add and divide instruction that adds two vector registers and divides the result in a single instruction;

means for loading a first vector register with a first plurality of elements from a source block;

means for loading a second vector register with a second plurality of elements adjacent to the first plurality of elements; and means for performing the add and divide instruction on the first and second vector register yielding interpolated source elements in a result vector register.

11. A computer program product for controlling a vector processing unit, the program comprising:

a computer readable medium;

means on said computer readable medium for causing a vector processing unit with vector operand routing, multiple operations per instruction, and an add and divide instruction that adds two vector registers and divides the result in a single instruction to load a first vector register with a first plurality of elements from a source block;

means on said computer readable medium for causing the vector processing unit to load a second vector register with a second plurality of elements adjacent to the first plurality of elements; and means on said computer readable medium for causing the vector processing unit to perform the add and divide instruction on the first and second vector register yielding interpolated source elements in a result vector register.

12. A system for drawing lines on a video display comprising:

a processor;

a multimedia extension unit coupled to the processor having operand routing, operation selection, and an add and divide instruction that adds two vector registers and divides the result in a single instruction;

a video system;

a first code segment for execution by said processor and said multimedia extension unit, said first code segment when executed causing said extension unit to load a first vector register with a first plurality of elements from a source block;

a second code segment for execution by said processor and said multimedia extension unit, said second code segment when executed causing said extension unit to load a second vector register with a second plurality of elements adjacent to the first plurality of elements; and a third code segment for execution by said processor and said multimedia extension unit, said third code segment when executed causing said extension unit to perform the add and divide instruction on the first and second vector register yielding interpolated source elements in a result vector register, wherein said video system is for displaying MPEG video motion compensated by said first, second, and third code segments.

* * * * *